United States Patent Office 2,906,716
Patented Sept. 29, 1959

2,906,716

N-THIOLALKYL QUATERNARY AMMONIUM ANION-EXCHANGE RESINS

Jesse C. H. Hwa, Levittown, Pa., assignor to Rohm & Haas Company, Philadelphia, Pa., a corporation of Delaware No Drawing. Application May 31, 1956
Serial No. 588,269

12 Claims. (Cl. 260—2.1)

This invention relates to anion-exchange resins and to their preparation and use. It relates to nitrogenous resins which are insoluble in aqueous solutions of acids, bases and salts and which are particularly suitable for the repeated removal of anions from fluids. The novel resins of the present invention are also characterized by the ability to take up the silver ion from solutions containing it, including solutions of silver thiosulfate.

The anion-exchange resins of the present invention are essentially addition polymers cross-linked by from about 0.1% to 40% by weight, in the copolymer molecule, of a polyethylenically unsaturated cross-linking agent co-polymerized with the main component or components derived from a monoethylenically unsaturated copolymerizable compound and the distinctive character of the novel resins is the presence therein of quaternary ammonium groups having attached to the nitrogen atom thereof from 1 to 3 thiolalkyl groups. These distinctive quaternary ammonium groups have the structure of Formula I:

I 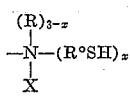

where R is selected from the group consisting of alkyl, alkenyl, alkynyl, and hydroxyalkyl groups having 1 to 4 carbon atoms, and alkoxyethyl groups having 3 to 4 carbon atoms, R° is an alkylene group having 2 to 4 carbon atoms of which at least two extend in a chain between the adjoined N and S atoms, X is an anion, either atom or group, such as OH, methosulfate, ethosulfate, and especially one of the halogens Cl, Br, and I, and $x$ is an integer having a value of 1 to 3.

The distinctive quaternary ammonium groups of the present invention are linked to the main chain of the polymer in any one of several ways. The linkage may be composed of an aralkyl group of the Formula II:

II —φR″— where φ is an arylene group selected from the group consisting of phenylene, naphthalene, and anthrylene, preferably phenyl, and R″ is selected from the group consisting of methylene and methylene groups substituted with one to two alkyl groups, said substituted group having a total of 2 to 4 carbon atoms.

Alternatively, the nitrogen atom of the quaternary ammonium group may be linked to the main chain of the polymer through linkages having the structure of Formula III:

III 

where Y is selected from the group consisting of —O— and —NH— and A is selected from the group consisting of —CH₂CH(OH)CH₂— and alkylene groups having 2 to 4 carbon atoms.

The characteristic units of the anion-exchange resins of the present invention have the structure of one of Formulas IIb and IIIb following:

IIb 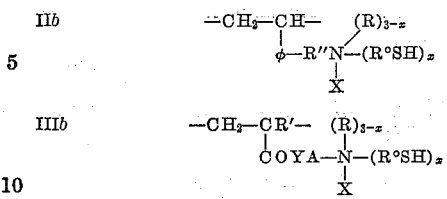

IIIb where R′ is selected from the group consisting of hydrogen and methyl, and the other symbols have the definitions given above.

The anion-exchange resins of the present invention may be prepared from cross-linked copolymers containing units of one or both of Formulas IIa and IIIa:

IIa 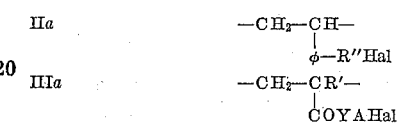

IIIa where Hal represents a halogen atom selected from the consisting of chlorine, bromine or iodine, and φ, Y, R′, R″, and A are as defined hereinabove. These cross-linked copolymers are known and are prepared in conventional ways and in order to produce the copolymers of the present invention they are reacted with a tertiary amine of the Formula IV:

IV $(R)_{3-x}N(R°SH)_x$ where R and R° are as defined above.

For convenience of reference, the polymers containing units of Formulas IIa and IIIa will be hereinafter referred to as halo-alkylated polymers. This reaction is preferably carried out by adding the amine to the halo-alkylated polymer while the latter is suspended and agitated in a liquid which is a solvent for the amine. The mixture may be allowed to react at room temperature or, preferably, at elevated temperatures, up to about 95° C., after which the resin, containing quaternary ammonium salt groups, is freed of the liquid.

It has been found to be advantageous to swell the halo-alkylated polymer prior to its reaction with the tertiary amine. This swelling facilitates the subsequent amination reaction and may be carried out by soaking the polymer in a suitable liquid, the most common of which are aromatic hydrocarbons such as benzene and toluene. Frequently the volume of the polymer will increase as much as 100%, although the amount of swelling depends to a great extent upon the amount of cross-linking which has taken place during the preparation of the original polymer. In general, swelling is inversely proportional to the degree of cross-linking.

As has been stated, the products of this invention are insoluble, infusible quaternary ammonium compounds. As prepared, they are quaternary ammonium salts; but the salts may be readily converted into quaternary ammonium hydroxides by washing with an hydroxide of an alkali metal.

The quaternary ammonium hydroxide or the quaternary ammonium halide salt may be converted to any other salt form, such as the sulfate, tartrate, acetate, or nitrate by simple ion-exchange procedures, for example, conversion to the sulfate may be effected by passing a 4% sodium sulfate solution through a column of the resin until it is saturated with the sulfate ion.

Examples of tertiary amines of Formula IV, which may be used to carry out the quaternization of the polymers containing units of Formulas IIa and IIIa, include the following: β-mercaptoethyldimethylamine, di - (β-mercaptoethyl)methylamine, tri - β-mercaptoethylamine, diethyl-β-mercaptoethylamine, γ - mercaptopropyldimethylamine, 4 - mercaptobutyldimethylamine, diallyl - β-mercaptoethylamine, β - mercaptoethyldipropynylamine, β-mercaptopropyldimethylamine, di - (β-mercaptopropyl)-methylamine, tri - (β-mercaptopropyl)amine, di-(β-hydroxyethyl) - β - mercaptoethylamine, di - (β-ethoxyethyl)-β-mercaptoethylamine.

An alternative method for the production of polymers of the present invention is to react the halo-alkylated polymer containing units of Formulas IIa or IIIa with an amine of Formula V:

V   $(R)_{3-x}N(R°SCH=CH_2)_x$ where R, R°, and x are as defined above.

The resulting vinyl sulfide containing quaternary ammonium polymer is then heated in an aqueous acid medium which hydrolyzes the vinyl sulfide group to a thiol group, liberating acetaldehyde. The quaternization with the amine of Formula V is carried out under essentially the same conditions as are given hereinabove for the quaternization by means of the amine of Formula IV. The hydrolysis of the vinyl sulfide to a thiol group may be carried out in the presence of any suitable mineral acid, such as hydrochloric acid, sulfuric acid, phosphoric acid, and sulfamic acid at a pH of about 1 to 5 at elevated temperatures, such as from 50° to 120° C. Preferably, from 0.1 to 5% of acid is used in an aqueous solution thereof and the conversion is effected at the boiling point of the medium. Conveniently, this conversion may be effected at the completion of the quaternization during the stripping of any excess amine or other solvent from the quaternization system, such as by steam distillation, a small amount of acid being introduced during the stripping operation.

The halo-alkylated polymers containing units of Formula IIa may be obtained in the usual way from cross-linked polymers of monovinyl aryl hydrocarbons by the halo-alkylation thereof. The cross-linked copolymers may be obtained by the copolymerization of one or more of such monomers with a polyethylenically unsaturated copolymerizable monomer which serves to cross-link the copolymer obtained. From 0.1 to 40% by weight of the cross-linking monomer may be used, but it is preferred to use from 1% to 5% by weight thereof in most cases. Examples of the aryl hydrocarbon monomers that may be cross-linked in this fashion include styrene, ortho-, meta-, and para-methyl styrenes, ortho-, meta-, and paraethyl styrenes, vinyl naphthalene, vinyl anthracene, and the homologues of the above.

The cross-linkers that may be used include divinylbenzene, which is preferred because of its convenience and availability, divinyltoluenes, divinylnaphthalenes, divinylethylbenzenes, divinylxylenes, divinylbenzenes, diallyl phthalate, ethylene glycol diacrylate or dimethacrylate, divinylxylene, divinylethylbenzene, divinyl ether, divinyl sulfone, allyl ethers of polyhydric compounds such as of glycerol, pentaerythritol, resorcinol, etc., divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicone, diallyl silicate, triallyl tricarballylate, triallyl aconitate, triallyl citrate, triallyl phosphate, N,N'-methylenediacrylamide, N,N'-methylenedimethacrylamide, N,N' - ethylidenediacrylamide, 1,2 - di(α-methylmethylene-sulfonamido)-ethylene, and so on.

The step of halo-alkylating the insoluble hydrocarbon copolymer may be carried out in a variety of ways. For example, it may be reacted with a mixture of an aldehyde and hydrochloric acid or a mixture of a dihalide and a Friedel-Crafts catalyst. Methods of chloroalkylating which may be used for introducing the —CH₂Cl group and which also serve as guides for introducing —C₂H₄X, —C₃H₆, and —C₄H₈X groups are described in "Organic Reactions," vol. I, chapter 3, page 63 et seq. (John Wiley & Sons, Inc. New York, N.Y., 1942).

The extent of the haloalkylation reaction may be conveniently determined by a halogen analysis. It is desirable that as many haloalkyl groups as possible be introduced into the insoluble copolymer because the number of such groups determines the number of quaternary ammonium groups in the final product; and, of necessity, the number of such quaternary ammonium groups determines the ultimate capacity of the resin to adsorb anions. Although resins containing relatively few quaternary ammonium groups have some capacity for adsorbing or exchanging anions, it is necessary from a practical standpoint to add a large number of such groups in order to produce a resin of sufficiently high capacity as to be commercially attractive. The minimum number of such groups should be one for every 15 aromatic hydrocarbon nuclei in the polymer. This, of course, requires that at least one haloalkyl group be first added for every 15 aromatic hydrocarbon nuclei; and in the case of a chloromethylated copolymer of styrene and 1% divinylbenzene such a product would analyze about 2% chlorine. The upper limit is that reached when every available position in the aromatic nuclei is haloalkylated. Satisfactory resins of high capacity can be made in which the number of haloalkyl groups, and, hence, the number of quaternary ammonium groups which are introduced is less than the theoretical maximum. Thus, very valuable resins are those made by aminating, with a tertiary amine, copolymers containing from 3 to 6 haloalkyl groups for every four aromatic hydrocarbon nuclei.

The haloalkylated polymers disclosed in the U.S. patent of McBurney, No. 2,591,573, are typical of the polymers so obtained and may be used in the present invention as the materials to be reacted with the amines of Formulas IV or V.

Polymers containing units of Formula IIIa may be made by a similar copolymerization of monomers having the structure of Formula VI:

VI   $\begin{array}{c}CH_2=CR'\\|\\COYAHal\end{array}$ with from about 0.1 to 40%, preferably from 1 to 5%, by weight of one of the cross-linkers mentioned above. The monomers of Formula VI are known and may be made in conventional ways. For example, the monomers which are esters in character may be made by reaction of an alkylene chlorohydrin, such as ethylene chlorohydrin and glycerol monochlorohydrin, with acrylic acid or methacrylic acid to esterify such acid. Instead of the acid, the anhydride thereof may be used or the reaction may be accomplished as a transesterification by using an alkyl ester of the acid, such as methyl acrylate or methyl methacrylate, for reaction with the alkylene chlorohydrin. The amides are also known and may be made by the aminolysis of an ester of acrylic or methacrylic acid, such as the methyl ester of either of such acids, by means of an aminoalkanol (such as β-aminoethanol) to produce the corresponding N-hydroxyalkylamide (such as the N-β-hydroxyethylamide) of the acid of the original ester. This aminolysis may be performed in an anhydrous medium, in which the amine itself may serve as the solvent, at temperatures of 90° to 130° C. for a time of about one to four days. The N-hydroxyalkyl-substituted acrylamide or methacrylamide is then reacted with thionyl chloride, SOCl₂ (to produce the compound of Formula VI). This reaction is effected with 50% molar excess of the thionyl chloride over the alcohol in the presence of an inert solvent, such as benzene, toluene, or xylenes at 0° C. to 50° C. for one to seven hours.

Not only do these resins reduce acidity but they are capable of removing anions per se from salt solutions as well. Thus, when a solution of sodium chloride is flowed down through a column of a resin of this invention in the hydroxyl form, the chloride ions of the salt solution are exchanged for the hydroxyl groups formerly associated with the resin, and the liquid leaves the column as a solution of sodium hydroxide. The resins may be regenerated by washing with a solution of a strong base such as sodium hydroxide. In addition to being chemically active, the resins have such physical characteristics as to be capable of repeated use and regeneration in conventional water-treating equipment. They are also characterized by the fact that they swell less during use in conventional water-treating equipment than phenolic resins in current commercial production.

Besides the normal anion-exchange activity of the quaternary ammonium group, the resins of the present invention have the exceptional property of being capable of absorbing the silver ion as such from solutions thereof. Even when the silver in such solutions is largely in the form of the complex silver thiosulfate ion, $Ag(S_2O_3)_2\equiv$, the resin absorbs on the order of about 50% more silver than corresponds to the amount of silver equivalent to the thiosulfate ion absorbed by the resin indicating that the resin is not absorbing merely the complex silver thiosulfate ion. Other known resins containing only quaternary ammonium functions are known to be capable of absorbing the silver thiosulfate complex ion but not an excess of the silver over that corresponding to the silver in the complex silver thiosulfate ion. On the other hand, resins containing only thiol groups are also known, but these resins fail to absorb silver in any form from a solution of silver thiosulfate. The resin of the present invention, therefore, is adapted peculiarly to recover silver from photographic rinse water or waste fixing solutions. The capability of the resin to accomplish this unusual function is apparently attributable to the presence of the thiolalkyl group on the quaternary nitrogen atom in the resin. The recovery of the silver ion from the anion-exchange resin on which it has been absorbed may be effected by elution with a sodium cyanide solution which withdraws the silver as a silver cyanide solution from which it is recovered in known manner.

In the following examples which are illustrative of the present invention, the parts and percentages are by weight unless otherwise indicated:

*Example 1*

In a glass reaction vessel fitted with a stirrer, a thermometer, a gas-inlet tube, and a reflux condenser, a mixture of 210 grams (equivalent to 0.477 mole of chlorine) of a chloromethylated styrene—4% divinylbenzene copolymer intermediate analyzing 18.2% chlorine (dry basis) and mixed with ethylene dichloride and water entrained by the beads of the intermediate which amounts to 44.2% of the total weight of the mixture, and prepared by the method described in U.S. Patent 2,725,361 (column 3, line 64 to column 4, line 19), 62.5 grams (0.552 mole) of 2-mercaptopropyldimethylamine and 250 ml. of water is stirred under a slow stream of nitrogen gas. The mixture is then heated to reflux for five hours (78° C.) after which the ethylene dichloride solvent which is present in the beads is removed by steam distillation. The resin is rinsed thoroughly with deionized water.

The thiolalkyl quaternary resin so prepared weighs 168 grams and has 62.5% solids, 3.1% nitrogen, 5.6% sulfur and 2.22 milliequivalents per gram dry of anion-exchange capacity.

*Example 2*

(a) In a manner similar to that of Example 1, a mixture of 30 grams (0.05 mole) of a chloromethylated styrene—1% divinylbenzene copolymer intermediate (34.6% solids, 17.1% chlorine), 9.0 grams (0.05 mole) of bis(2-mercaptopropyl)methylamine (prepared from methylamine and excess propylene sulfide) and 50 ml. of water is refluxed for 4 hours. After purification by steam distillation and rinsing with deionized water, there is obtained 21.4 grams of wet resin having 51.3% solids and 3.56 milliequivalents per gram dry of anion-exchange capacity.

(b) The procedure of part (a) is repeated substituting a bromomethylated vinyl toluene/2% divinyltoluene copolymer intermediate.

(c) A similar anion-exchange resin is obtained by repeating part (a) with the substitution of a chloromethylated vinyl naphthalene/styrene/divinylbenzene (20/75/5 mole percent) copolymer intermediate.

*Example 3*

In a manner similar to that of Example 1, a mixture of 205 grams (0.46 mole) of a chloromethylated styrene—4% divinylbenzene copolymer intermediate (42.6% solids, 18.6% chlorine), 53.5 grams (0.46 mole) of 2-vinylmercaptoethyldimethylamine is refluxed for 4 hours. 10 ml. of concentrated hydrochloric acid is added to the mixture and refluxing is continued for three more hours. After steam distillation and water washings, the mercaptoethyl quaternary ammonium type resin is obtained in 202 grams yield having 60.8% solids, 7.8% sulfur, 4.0% nitrogen, 10.5% chlorine (analyses on dry weight basis), 0.31 milliequivalent per gram dry of cation-exchange capacity and 2.22 milliequivalents per gram dry of anion-exchange capacity.

*Example 4*

A mixture of 144 grams (0.35 mole) of chloromethylated styrene—4% divinylbenzene copolymer intermediate (45.2% solids, 19.0% chlorine), 52 grams (0.40 mole) of 3-vinylmercaptopropyldimethylamine and 140 ml. of water is refluxed for 4 hours after which 10 ml. of concentrated hydrochloric acid is added and refluxing was continued for 3 more hours. After usual work-up, 279 grams of moist resin is obtained. The product has 64.4% solids, 3.8% nitrogen, 2.97 milliequivalents per gram dry and 1.17 milliequivalents per ml. wet of anion-exchange capacity, 2.38 milliequivalents per gram dry and 0.94 milliequivalent per ml. wet of salt-splitting anion-capacity, and 38.3 lbs./cu. ft. of density.

*Example 5*

A mixture of 25 parts of a copolymer of 4% of ethylene glycol dimethacrylate with 96% of N-β-chloroethylacrylamide, 30 parts of tri-(β-mercaptoethyl)amine, 50 parts of alcohol, and 180 parts of water is stirred under a slow stream of nitrogen gas. The mixture is heated to reflux for 5½ hours. The copolymer beads are thoroughly rinsed first with alcohol and then with deionized water. The product contains β-acrylamidoethyl-tri-(β-thiolethyl) ammonium chloride units and has anion-exchange properties.

*Example 6*

A mixture of 60 parts of a copolymer of 3% of diallyl phthalate and 97% of γ-chloro-β-hydroxypropyl methacrylate, 80 parts of di(β-hydroxyethyl)β-mercaptoethylamine, and 100 parts each of dimethylformamide and water is heated to reflux under a nitrogen blanket for 8 hours. The copolymer beads are thoroughly washed with water and yield an anion-exchange resin product containing units of the Formula VII:

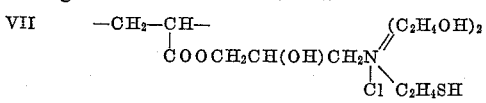

*Example 7*

An aqueous silver thiosulfate solution is obtained by dissolving per liter of water 1 gram of sodium thiosulfate and 0.34 gram of silver nitrate. This solution is passed, at a rate of 2 gal. per cubic foot of resin per minute, through a column of the resin obtained in Example 1 after regeneration of the resin by treatment with a 4% aqueous solution of sodium hydroxide and rinsing with water.

After 50 volumes of the solution per volume of resin are passed through, the thiosulfate ion started leaking through whereas silver did not leak through in any form until 75 volumes of the solution per volume of resin had passed through. At this later stage, an aqueous 4% sodium cyanide solution is passed through the resin to remove the silver as silver cyanide which is then recovered by the usual procedures.

*Example 8*

The procedure of Example 7 is repeated with the resin of Example 3. In this case, after 50 volumes of the solution per volume of resin are passed through, the thiosulfate ion started leaking through whereas silver did not leak through in any form until 67½ volumes of the solution per volume of resin had passed through.

It is to be understood that changes and variations may be made without departing from the spirit and scope of the invention as defined in the appended claims.

I claim:

1. A resin composition comprising an insoluble copolymer crosslinked by from about 0.1 percent to 40 percent by weight, in the copolymer molecule, of a polyethylenically unsaturated crosslinking agent copolymerized with a monovinyl aromatic hydrocarbon, there being attached to the aromatic rings of said copolymer, on the basis of at least one for every fifteen aromatic hydrocarbon nuclei, a substituent quaternary ammonium group having the formula $$-R''-\underset{\underset{X}{|}}{\overset{(R)_{3-x}}{\overset{|}{N}}}-(R°SH)_x$$

where R is selected from the group consisting of alkyl, alkenyl, alkynyl, hydroxyalkyl groups having 1 to 4 carbon atoms, and alkoxyethyl groups having 3 to 4 carbon atoms, R'' is selected from the group consisting of methylene and methylene groups substituted with one to two alkyl groups, said substituted groups having a total of 2 to 4 carbon atoms, R° is an alkylene group having 2 to 4 carbon atoms of which at least two extend in a chain between the adjoined N and S atoms, X is an anion, and $x$ is an integer having a value of 1 to 3.

2. The resin composition of claim 1 in which the quaternary ammonium group has the formula

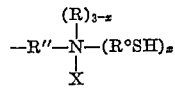

where X is an anion.

3. The resin composition of claim 1 in which the quaternary ammonium group has the formula

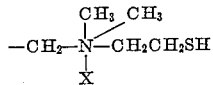

where X is an anion.

4. The resin composition of claim 1 in which the monovinyl aromatic hydrocarbon is styrene.

5. The resin composition of claim 1 in which the monovinyl aromatic hydrocarbon is vinyl toluene.

6. The resin composition of claim 1 in which the monovinyl aromatic hydrocarbon is styrene and X is chlorine.

7. The resin composition of claim 1 in which the monovinyl aromatic hydrocarbon is vinyl toluene and X is chlorine.

8. The resin composition of claim 1 in which the monovinyl aromatic hydrocarbon is styrene and the substituent quaternary ammonium group is

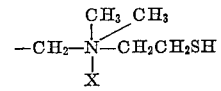

where X is an anion.

9. The resin composition of claim 1 in which the monovinyl aromatic hydrocarbon is styrene and the substitutent quaternary ammonium group is

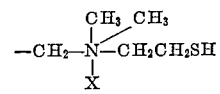

where X is chlorine.

10. A resin composition comprising an insoluble copolymer, said copolymer being comprised of (a) from about 0.1 percent to 40 percent, by weight, of a polyethylenically unsaturated crosslinking agent, (b) copolymerized units having the structure

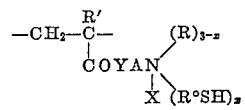

and (c) copolymerized units having the structure

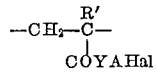

where there is at least one of said units of (b) for every fifteen molar units or (b) and (c) combined, and where R is selected from the group consisting of alkyl, alkenyl, alkynyl, hydroxyalkyl groups having 1 to 4 carbon atoms, and alkoxyethyl groups having 3 to 4 carbon atoms, R' is selected from the group consisting of H and methyl, R° is an alkylene group having 2 to 4 carbon atoms of which at least two extend in a chain between the adjoined N and S atoms, X is an anion, Y is selected from the group consisting of —O— and —NH—, A is selected from the group consisting of —CH$_2$CH(OH)CH$_2$— and alkylene groups having 2 to 4 carbon atoms, Hal is a halogen, and $x$ is an integer from 1 to 3.

11. The resin composition of claim 10 in which Y is —O—, A is CH$_2$CH(OH)CH$_2$, R is C$_2$H$_4$OH, R' is hydrogen, R° is CH$_2$CH$_2$, $x$ is 1, and Hal is chlorine.

12. The resin composition of claim 10 in which Y is —NH—, A is CH$_2$CH$_2$, R' is hydrogen, R is C$_2$H$_4$OH, R° is CH$_2$CH$_2$, $x$ is 1, and Hal is chlorine.

References Cited in the file of this patent

UNITED STATES PATENTS

| | | |
|---|---|---|
| 2,548,679 | Olin | Apr. 10, 1951 |
| 2,597,440 | Bodamer | May 20, 1952 |
| 2,702,795 | Gilwood | Feb. 22, 1955 |